US012627643B2

(12) United States Patent
Feinberg et al.

(10) Patent No.: US 12,627,643 B2
(45) Date of Patent: *May 12, 2026

(54) SYSTEM AND METHOD TO IMPROVE USER AUTHENTICATION FOR ENHANCED SECURITY OF CRYPTOGRAPHICALLY PROTECTED COMMUNICATION SESSIONS

(71) Applicant: CHOL, Inc., Irvine, CA (US)

(72) Inventors: Michael R. Feinberg, Newport Beach, CA (US); Richard J. Blech, Irvine, CA (US)

(73) Assignee: CHOL, Inc., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/423,966

(22) Filed: Jan. 26, 2024

(65) Prior Publication Data

US 2025/0063027 A1     Feb. 20, 2025

Related U.S. Application Data

(63) Continuation of application No. 17/448,180, filed on Sep. 20, 2021, now Pat. No. 11,888,832, which is a
(Continued)

(51) Int. Cl.
*H04L 9/40* (2022.01)
*H04L 9/32* (2006.01)

(52) U.S. Cl.
CPC .......... *H04L 63/061* (2013.01); *H04L 9/3247* (2013.01); *H04L 63/0435* (2013.01); *H04L 63/166* (2013.01)

(58) Field of Classification Search
CPC . H04L 63/061; H04L 63/0435; H04L 63/166; H04L 63/08; H04L 9/3247; H04L 9/0825; H04L 9/14
See application file for complete search history.

(56) References Cited

U.S. PATENT DOCUMENTS 6,237,098 B1 *  5/2001  Libicki ................. G01G 19/02
                                                        713/185
8,352,725 B1 *  1/2013  O'Toole, Jr. .......... H04L 63/061
                                                        713/151
(Continued)

*Primary Examiner* — Khoi V Le
(74) *Attorney, Agent, or Firm* — Knobbe, Martens, Olson & Bear, LLP

(57) ABSTRACT

A computerized method supporting SSL-based or TLS-based communications with multiple cryptographically protected transmissions is described. Responsive to a first transmission including a first content encrypted with a public key of an intended recipient and a first digital signature for use in detect tampering to the first content, a second transmission is received. The second transmission includes a combined result including the first content and a second content, which is encrypted with a public key of the sender. Recovery of the first content verifies to the sender that the second transmission originated from the intended recipient. Thereafter, a third transmission is sent. The third transmission has data including at least the second content, being the remaining data after extraction of the first content from the combined result, which is encrypted with the public key of the intended recipient and a third digital signature for use in verifying non-tampering of the data.

20 Claims, 12 Drawing Sheets

Related U.S. Application Data continuation of application No. 16/219,746, filed on Dec. 13, 2018, now Pat. No. 11,128,609.

(56) References Cited

U.S. PATENT DOCUMENTS

| | | | | |
|---|---|---|---|---|
| 2004/0098590 A1* | 5/2004 | Fausse | .................. | H04L 9/3263 |
| | | | | 713/176 |
| 2013/0124860 A1* | 5/2013 | Maidl | .................. | H04L 63/123 |
| | | | | 713/164 |

* cited by examiner

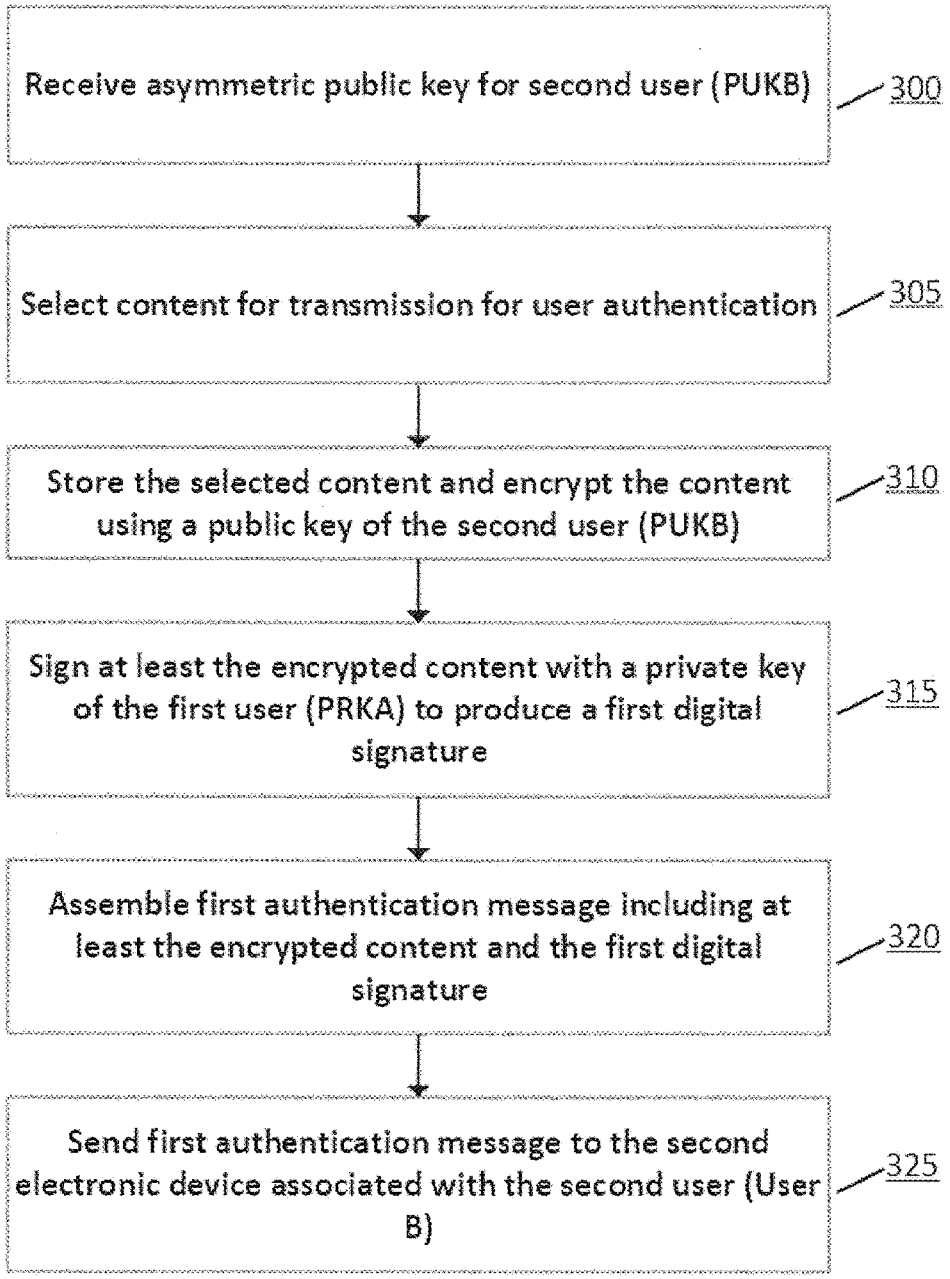

Receive asymmetric public key for second user (PUKB) — 300

Select content for transmission for user authentication — 305

Store the selected content and encrypt the content using a public key of the second user (PUKB) — 310

Sign at least the encrypted content with a private key of the first user (PRKA) to produce a first digital signature — 315

Assemble first authentication message including at least the encrypted content and the first digital signature — 320

Send first authentication message to the second electronic device associated with the second user (User B) — 325

FIG. 3A

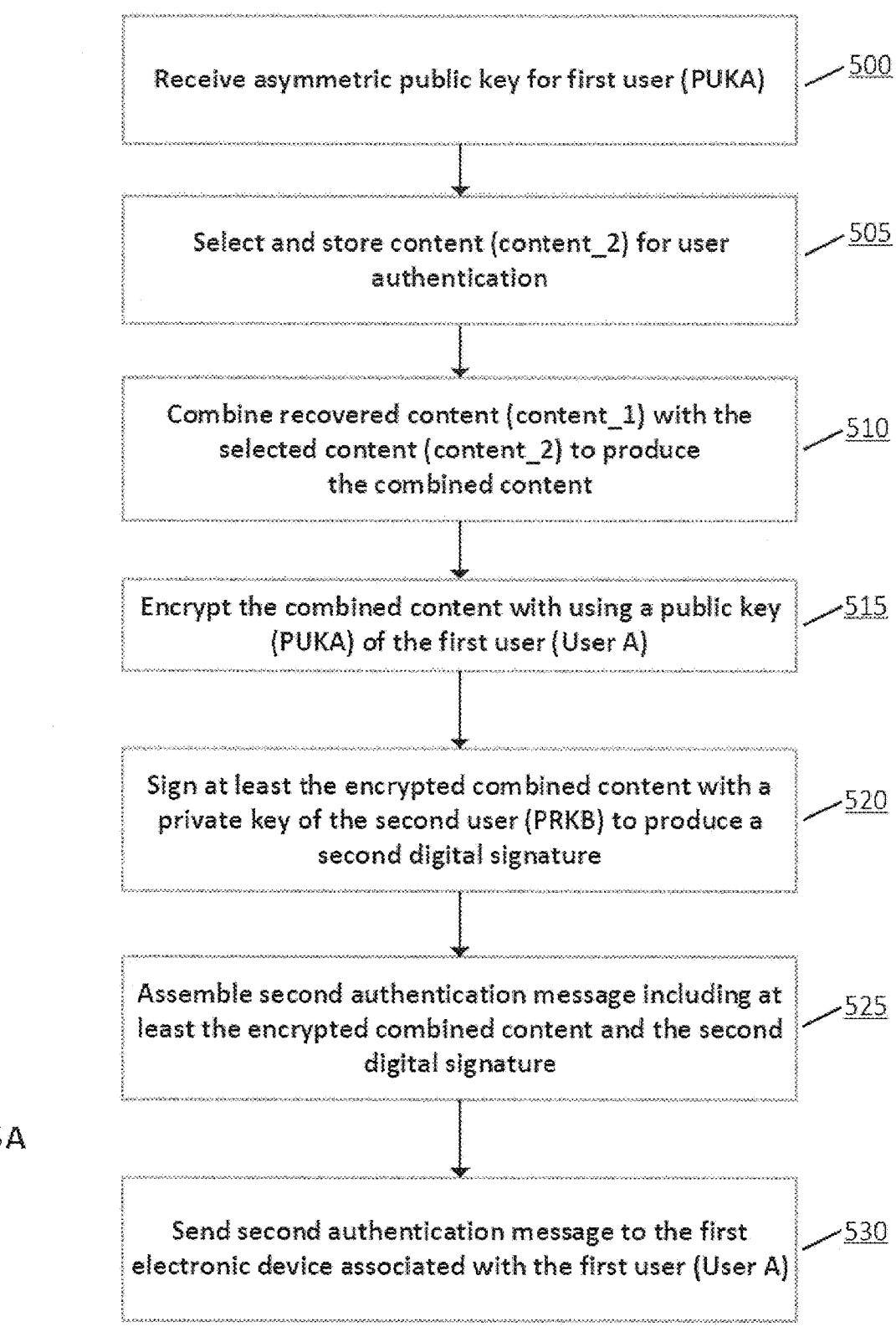

Receive asymmetric public key for first user (PUKA) — 500

Select and store content (content_2) for user authentication — 505

Combine recovered content (content_1) with the selected content (content_2) to produce the combined content — 510

Encrypt the combined content with using a public key (PUKA) of the first user (User A) — 515

Sign at least the encrypted combined content with a private key of the second user (PRKB) to produce a second digital signature — 520

Assemble second authentication message including at least the encrypted combined content and the second digital signature — 525

Send second authentication message to the first electronic device associated with the first user (User A) — 530

FIG. 5A

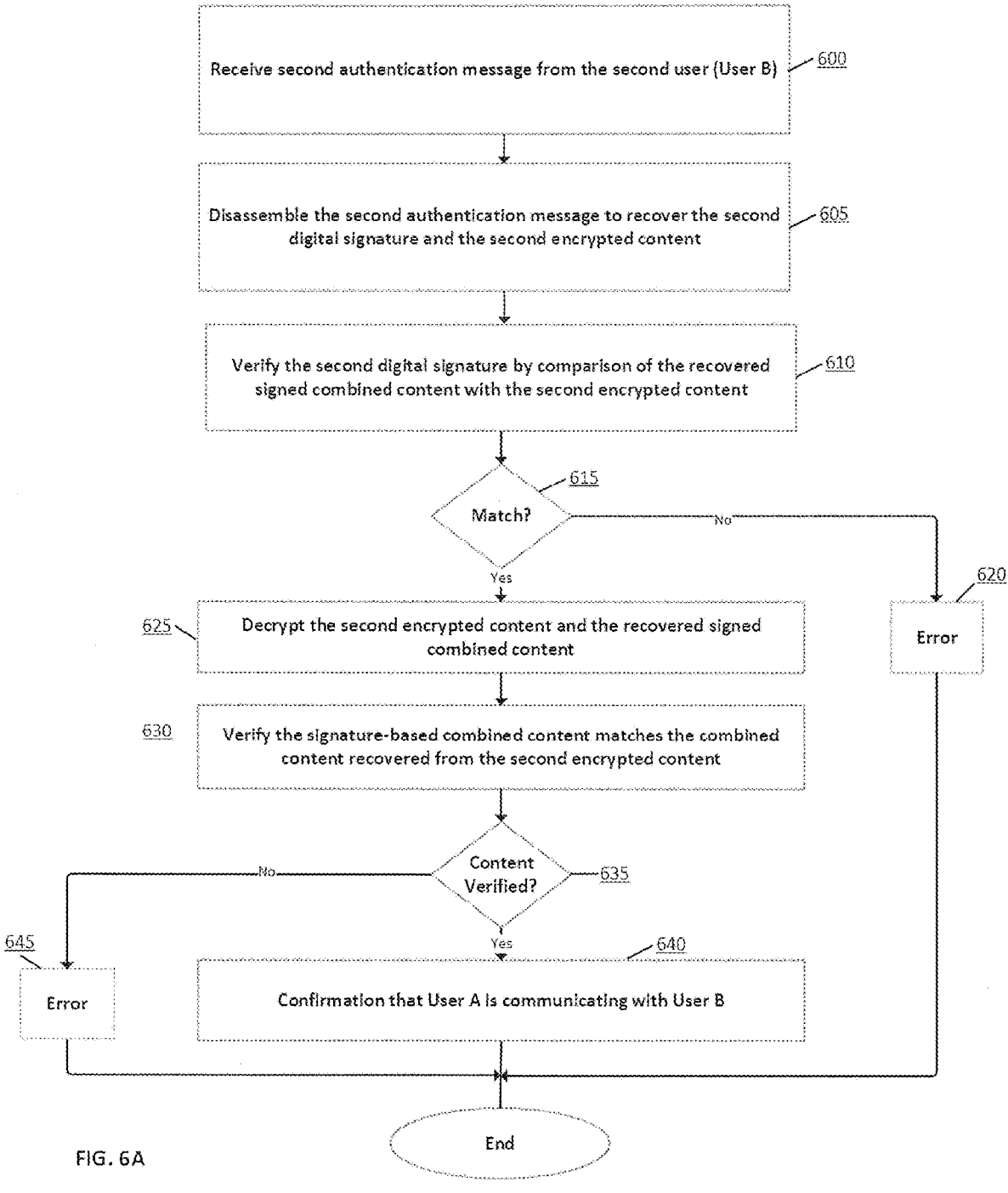

Receive second authentication message from the second user (User B)  — 600

Disassemble the second authentication message to recover the second digital signature and the second encrypted content  — 605

Verify the second digital signature by comparison of the recovered signed combined content with the second encrypted content  — 610

— 615
Match?

No

Yes

625 — Decrypt the second encrypted content and the recovered signed combined content 620
Error 630 — Verify the signature-based combined content matches the combined content recovered from the second encrypted content Content Verified? — 635

No

Yes

645
Error

— 640
Confirmation that User A is communicating with User B

End

FIG. 6A

SYSTEM AND METHOD TO IMPROVE USER AUTHENTICATION FOR ENHANCED SECURITY OF CRYPTOGRAPHICALLY PROTECTED COMMUNICATION SESSIONS

CROSS REFERENCE TO RELATED APPLICATIONS

This application is a continuation of U.S. patent application Ser. No. 17/448,180, filed Sep. 20, 2021, which is a continuation of U.S. patent application Ser. No. 16/219,746, filed Dec. 13, 2018, the contents of which are incorporated by reference herein and made part of this specification.

EXPORT CONTROL

Information in this patent application is controlled by the U.S. Government and authorized for access only by U.S. persons and licensed non-U.S. persons. Please contact the assignee for further guidance if you wish to give access to the subject application to a non-U.S. person. This statement attaches to any use or incorporation of said patent application into other applications or any other use.

1. Field

Embodiments of the disclosure relate to the field of cryptography. More specifically, an embodiment of the disclosure is directed to a cryptographic communication scheme configured to provide more reliable user authentication and/or key exchange.

2. General Background

The use of electronic data and other information has become an integral part of our daily lives. Each day, more and more emails, texts, electronic documents, and other forms of electronic data are stored and transmitted throughout the world by businesses and individuals alike. Accordingly, there exists an increasing need to protect the confidentiality of information contained within the electronic data from unauthorized disclosure and avoid man-in-the-middle attacks that are becoming more prevalent every year.

In some cases, the electronic data may include sensitive data, such as wiring instructions, bank account statements, credit card numbers, trade or government secrets, intellectual property or personally identifiable information, which has intrinsic value to both legitimate and non-legitimate actors. Encryption is one technique for protecting the confidentiality of this sensitive data from eavesdroppers or other unauthorized parties. The goal of encryption is not to hide the existence of such information, but rather, to hide its meaning and to ensure that legitimate (authenticated) person have access to the information as plaintext (e.g., non-encrypted data). Hence, encrypted data includes data that has been obfuscated according to a selected cryptographic key and cryptographic cipher. By obfuscating the data, the confidentiality is assured and the data is rendered computationally secure. That is, although an attacker may "theoretically" break a cryptographic scheme by enumerating all possible keys, the confidentiality of the data is protected when it is considered infeasible for the attacker to uncover data as plaintext from stored or transmitted ciphertext (e.g., encrypted data) in any reasonable amount of time given available computing power.

In the past, prior cryptography techniques have been configured to prevent unauthorized access to the data by third parties. One popular type of cryptographic technique involves asymmetric key cryptography such as RSA (Rivest Shamir Adleman) based cryptography. RSA-based cryptography has been widely used to support standardized security communication protocols such as Secure Socket Layer (SSL) and Transport Layer Security (TLS). SSL and TLS based communications rely on a single peer-to-peer transmission for user authentication, which involves obtaining a SSL certificate for a targeted destination to confirm that the SSL certificate is active (i.e., unexpired and unrevoked). This authentication scheme fails to conduct an analysis of results of secured communications to more precisely confirm that communications are, in fact, occurring with the targeted destination.

Furthermore, with the recent advancement of quantum computing, RSA-based cryptography up to 15-bit key lengths have been compromised. Given the wide adoption of RSA, increased exposure to any attack on RSA-based cryptography, especially as quantum computing advancements grow exponentially, is highly problematic as millions of secure communications on a daily basis could be compromised, and thus, any data transmitted over RSA-based cryptography would be suspect. While certain key lengths of RSA-based cryptosystems are still difficult to attack and bypass (e.g., 256-bit key lengths), with the advent of quantum computing and other technological advancements that increase the likelihood of successful man-in-the-middle attacks, a more reliable and secure user authentication scheme would greatly improve the longevity and continued utility of asymmetric key cryptographic schemes such as RSA.

BRIEF DESCRIPTION OF THE DRAWINGS

Embodiments of the invention are illustrated by way of example and not by way of limitation in the figures of the accompanying drawings, in which like references indicate similar elements and in which:

FIG. 3A is an exemplary embodiment of a first cryptographically protected transmission in accordance with the SAIL protocol.

FIG. 5A is an exemplary embodiment of a second cryptographically protected transmission in accordance with the SAIL protocol.

FIG. 6A is an exemplary embodiment of recovery and authentication of the combined content provided in the second cryptographically protected transmission in accordance with the SAIL protocol.

DETAILED DESCRIPTION

Various embodiments of the disclosure are directed to an asymmetric cryptographic communication scheme configured to provide a more reliable user authentication and/or key exchange protocol, referred to as "Secure Authentication and Identity Loop" (SAIL). Herein, for conducting user authentication and key exchange using SAIL, both a first user (source) and a second user (destination) utilize asymmetric keys to encrypt, sign and recover content for use in securely identifying and authenticating each of the users prior to commencing a communication session. For each asymmetric key pair, a public key and a corresponding private key are mathematical inverses, and thus, are commonly generated at the same time. The public keys for a plurality of users, including the first and second users, are made publicly available, which allows the first user (source) to encrypt content directed to the second user (destination) using the second user's public key and generate a message, including the encrypted content and a corresponding digital signature, for transmission to the second user. The second user relies on its corresponding private key, where disclosure of the private key is avoided, to recover the content that was encrypted using the second user's public key.

Figure 3B:
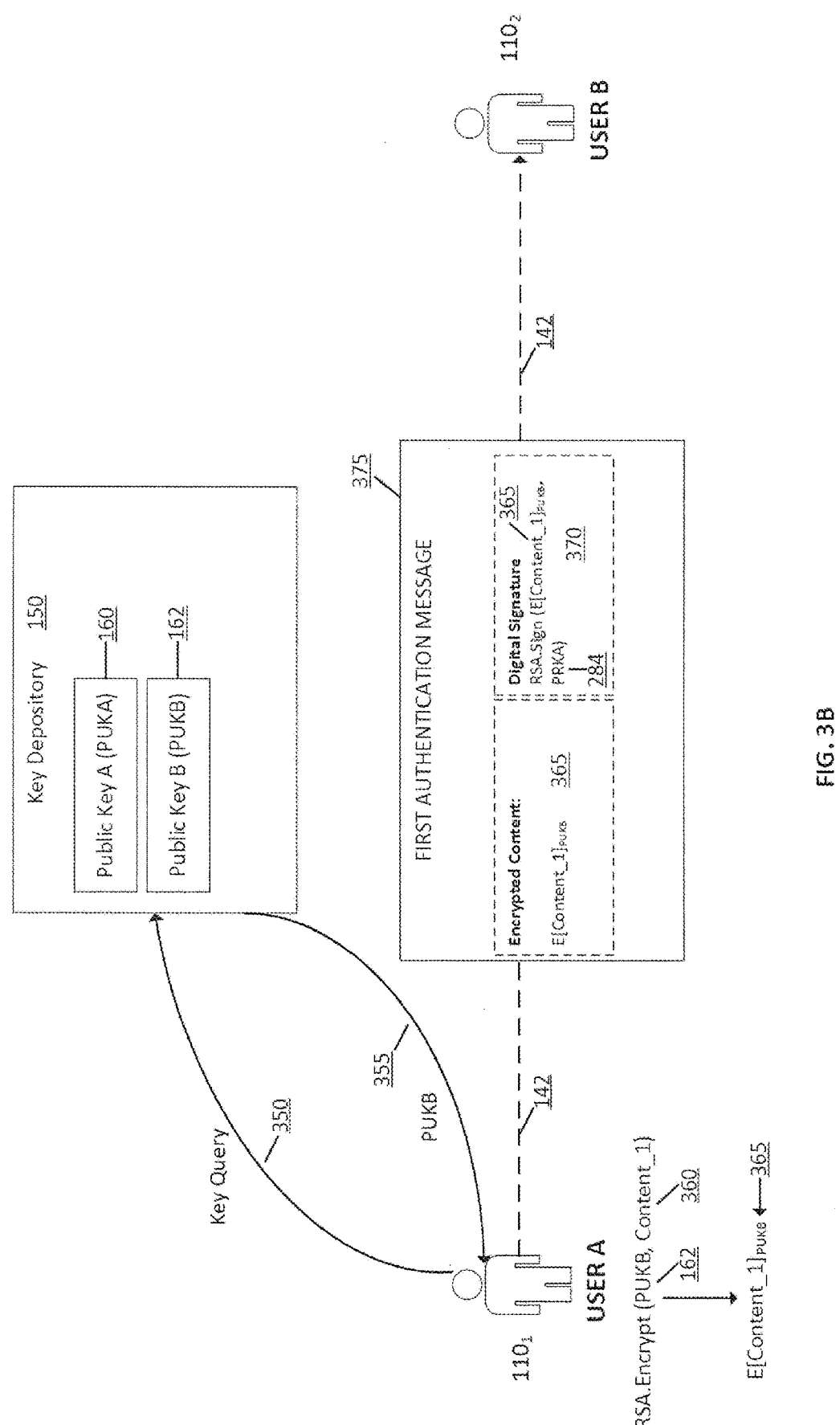
FIG. 3B is an illustrative diagram of the first cryptographically protected transmission as shown in FIG. 3A.

In contrast to Secure Sockets Layer (SSL) or Transport Layer Security (TLS) based communications, the SAIL protocol features three (3) peer-to-peer cryptographically protected transmissions to identify and authenticate users. During a first cryptographically protected transmission, a first user transmits content in an encrypted form to a second user. The content may include any collection of information, including one or more images, videos, alphanumeric characters, audio, or any combination thereof. As illustrative operations of the first cryptographically protected transmission, a first electronic device associated with a first user (User A) transmits a first authentication message to a second electronic device associated with a second user (User B). Herein, the first authentication message includes encrypted content that corresponds to a first content (content_1) encrypted on a public key (PUKB) assigned to the second user (User B), as represented in FIG. 3B by the nomenclature "E[Content_1]$_{PUKB}$." Along with the encrypted content (E[Content_1]$_{PUKB}$), the first authentication message further includes a first digital signature, which is formed by digitally signing at least the encrypted content (e.g., entire encrypted content, a representation of the encrypted content such as its hash value, or a portion of the encrypted content or its hash value) with a private key (PRKA) assigned to the first user (User A). From the first authentication message, the second electronic device may determine that the encrypted content has not been tampered and recover the first content (content_1) known by the first user (User A).

Figure 5B:
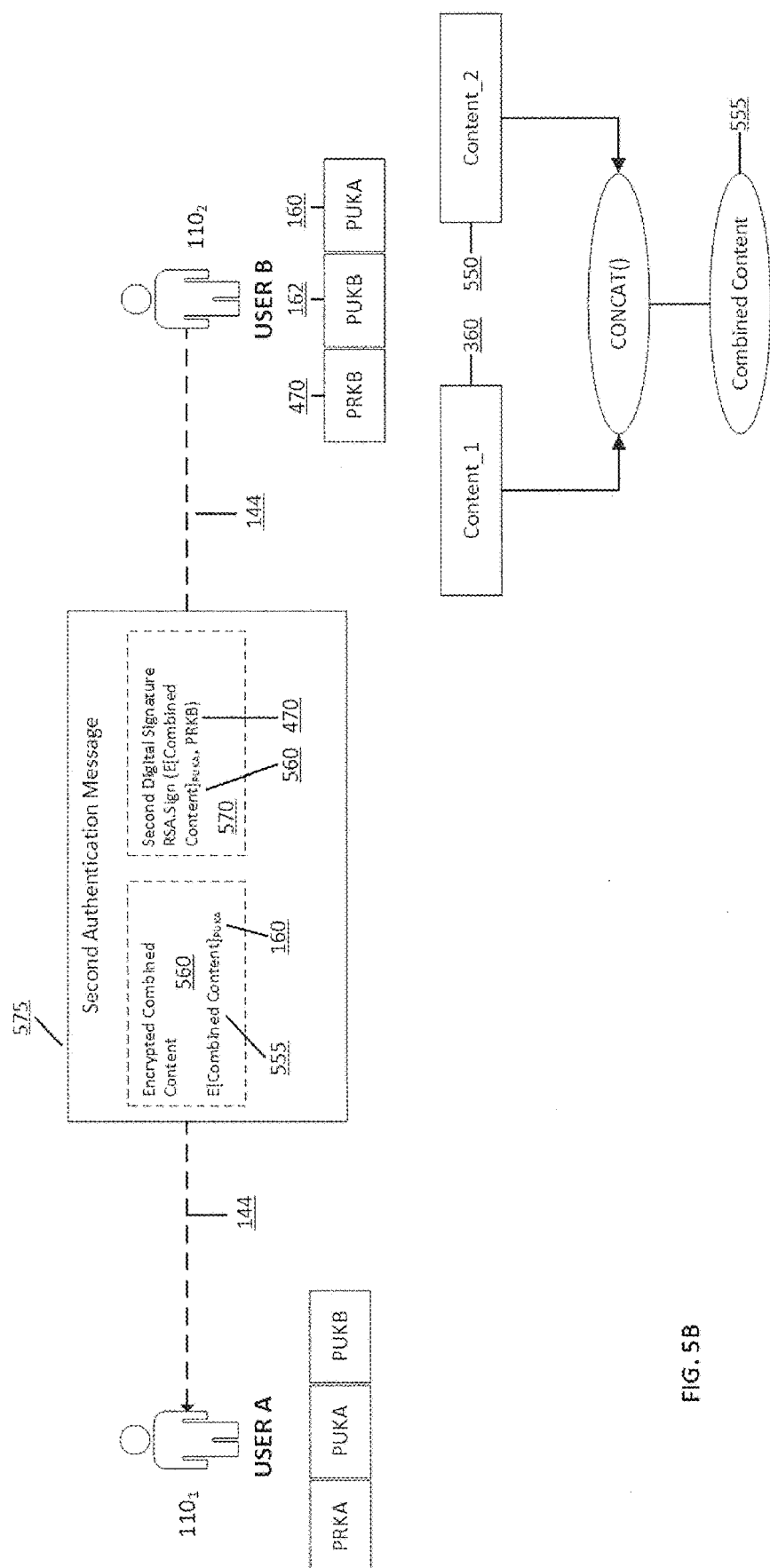
FIG. 5B is an illustrative diagram of the second cryptographically protected transmission of FIG. 5A.

For a second cryptographically protected transmission, the second user (User B) returns content in an encrypted form to the first user (User A), where the returned content may be based, at least in part, on (i) content provided by the first user (User A) in the first cryptographically protected transmission and recovered as plaintext (content_1) and (ii) additional content known exclusively by the second user (User B). Identification of the plaintext (content_1) within non-encrypted content recovered from the second cryptographically protected transmission assists in confirming communications with the second user (User B). For instance, the second electronic device may be configured to return encrypted content, where this content is a combination of the first content (content_1) and a second content (content_2) selected by the second electronic device (User B), which is encrypted with a public key (PUKA) of the first user (User A) as represented in FIG. 5B by the reference label "E[Combined Content]$_{PUKA}$." According to one embodiment of the disclosure, the "combined content" may include a concatenation of the first content (content_1) and the second content (content_2). Other embodiments of the combined content may include a result produced by a bitwise or byte wise logical operation performed between the first content and the second content (e.g., bitwise or byte wise OR, AND, XOR, etc.).

Figure 6B:
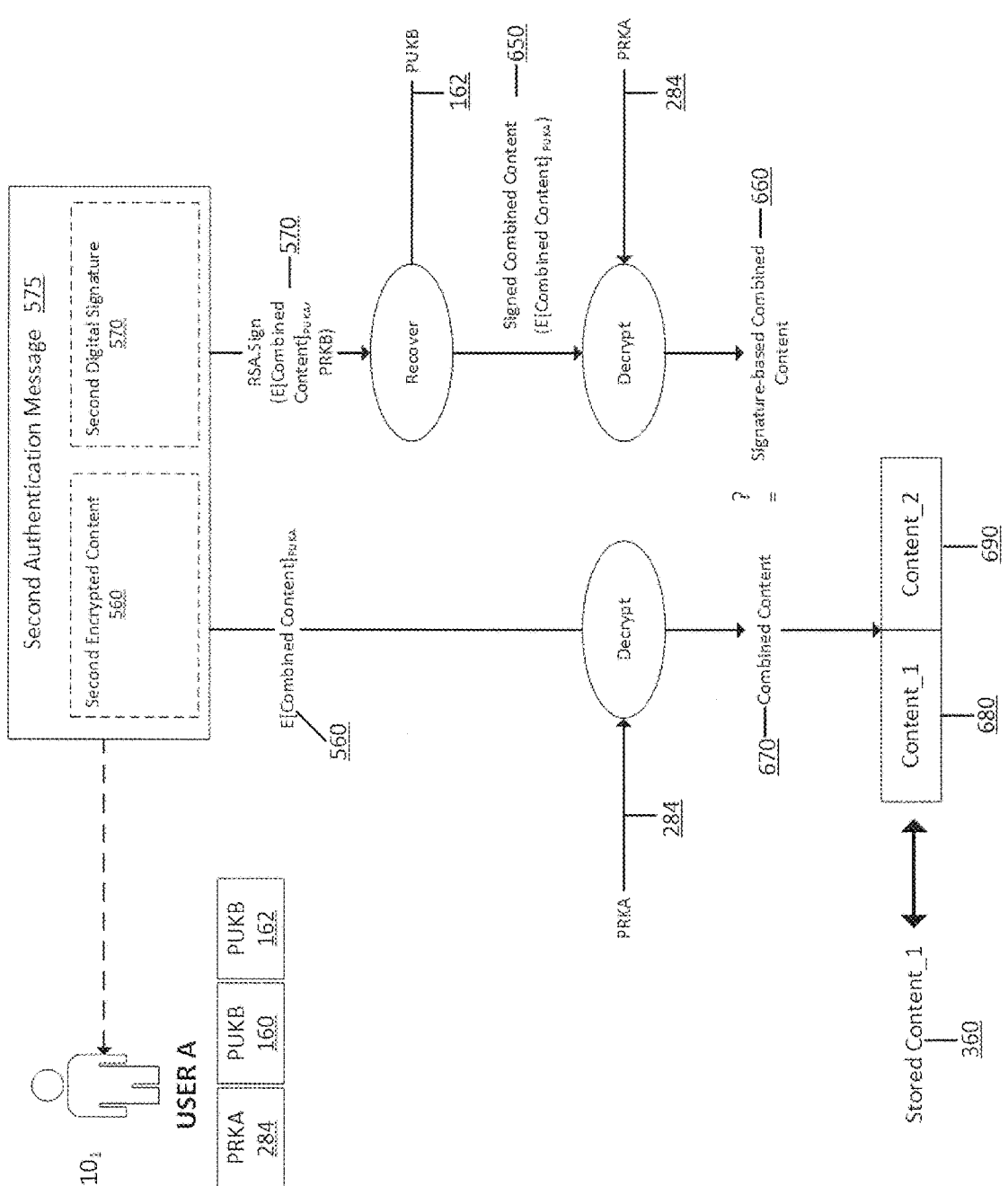
FIG. 6B is an illustrative diagram of the authentication of communications with the receiver based on a presence of a first content recovered from the second cryptographically protected transmission of FIG. 6A.

Along with this encrypted content (E[Combined Content]$_{PUKA}$), the second electronic device transmits the first digital signature, which includes at least the encrypted combined content (or a representation of the encrypted combined content) that is encrypted with a private key (PRKB) assigned to the second user (User B). Upon receipt and processing of information within the second cryptographically protected transmission, the first user (or User A) will be able to determine (i) whether the second cryptographically protected transmission is from the second user (User B) based upon successful recovery of the combined content and (ii) the first cryptographically protected transmission has been received by the second user (User B) upon the first user (User A) determining that the first content (content_1) is included as part of the combined content as shown in FIG. 6B.

Thereafter, for a third cryptographically protected transmission, the first user (User A) extracts the first content provided in the first cryptographically protected transmission sent by the first user (User A) from the combined content. As a result, only content known exclusively by the second user (User B). The return of the remaining combined content, being the second content, confirms to the second user (User B) that the first and third cryptographic communications originated from the first user (User A). For instance, the first electronic device may be configured to extract the first content (content_1) from the combined content and return the second content (content_2) encrypted with the public key of the second user (PUKB), as represented in FIGS. 6B-7B as "E[Content_2]$_{PUKB}$." Additionally, the first electronic device may also return a third digital signature including at least a portion of the encrypted second content (or a representation of the encrypted second content) encrypted with a private key (PRKA).

Upon successful receipt of the information included in the third cryptographically protected transmission, based on retrieval of the second content (content_2), the second user (User B) is able to confirm that the third cryptographically protected transmission originated from the first user (User A), given that only the first user (with the stored first content) would be able to extract the first content (content_1) from the combined content and return the second content (content_2) to the second user.

Additionally, as an optional feature, a symmetric key (SK) may be encrypted with the second content (content_2)

US 12,627,643 B2

5                                                        6 thereby securely exchanging the symmetric key (SK) between the first electronic device and the second electronic device. Hence, in some deployments, SAIL may be used in lieu of TLS and OAuth 2 within a key exchange system that is configured to distribute one or more keys to subscribed electronic devices distributed over a network.

I. Terminology

In the following description, certain terminology is used to describe aspects of the invention. For example, in certain situations, the terms "logic" and "component" are representative of hardware, firmware and/or software that is configured to perform one or more functions. As hardware, logic (or a component) may include circuitry having data processing or storage functionality. Examples of such processing or storage circuitry may include, but is not limited or restricted to the following: a processor; one or more processor cores; a programmable gate array; an I/O controller (e.g., network interface controller, disk controller, memory controller, keyboard controller, etc.); an application specific integrated circuit; receiver, transmitter and/or transceiver circuitry; semiconductor memory; combinatorial logic, or combinations of one or more of the above components.

Logic (or a component) may be in the form of one or more software modules, such as executable code in the form of an operating system component, an executable application, firmware, an application programming interface (API), one or more subroutines, a function, a procedure, an applet, a plug-in, a servlet, a Component Object Model (COM) object, a routine, source code, object code, a shared library/ dynamic linked library, a script, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or portable memory device; and/or certain semiconductor memory. As firmware, the executable code is stored in persistent storage.

For this disclosure, a "user" may be construed as an electronic device involved in a communication session for user authentication and/or an individual in control of the electronic device. An "electronic device" generally refers to a computing device with network accessibility via a network interface (e.g., a network interface controller, wireless transceiver, memory controller, a physical or logical port, etc.). Examples of a computing device may include, but are not limited or restricted to the following: a server; a router or other signal propagation networking equipment (e.g., a wireless or wired access point); a set-top box; a video-game console; an endpoint device (e.g., a stationary or portable computer including a desktop computer, laptop, electronic reader, netbook or tablet; a smart phone; or wearable technology such as a Fitbit® fitness wristband, or other sensor-based component); or a virtual device with similar functionality.

The term "ciphertext" includes information, data or any other content in an encrypted format. Similarly, the term "plaintext" refers generally to information, data or any other content in an unencrypted format, which may be included as part of a message or recovered after decryption of corresponding ciphertext. In a stored format, the plaintext is sometimes referred to as "cleartext." A "message is information that is stored or transmitted in accordance with a prescribed format, which may include one or more packets or frames, a file, or any collection of bits grouped in the prescribed format.

The term "interconnect" is a physical or logical communication path to or within an electronic device. For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "computerized" generally represents that corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" may mean any of the following: "A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and is not intended to limit the invention to the specific embodiments shown and described.

II. General System Architecture

Figure 1:
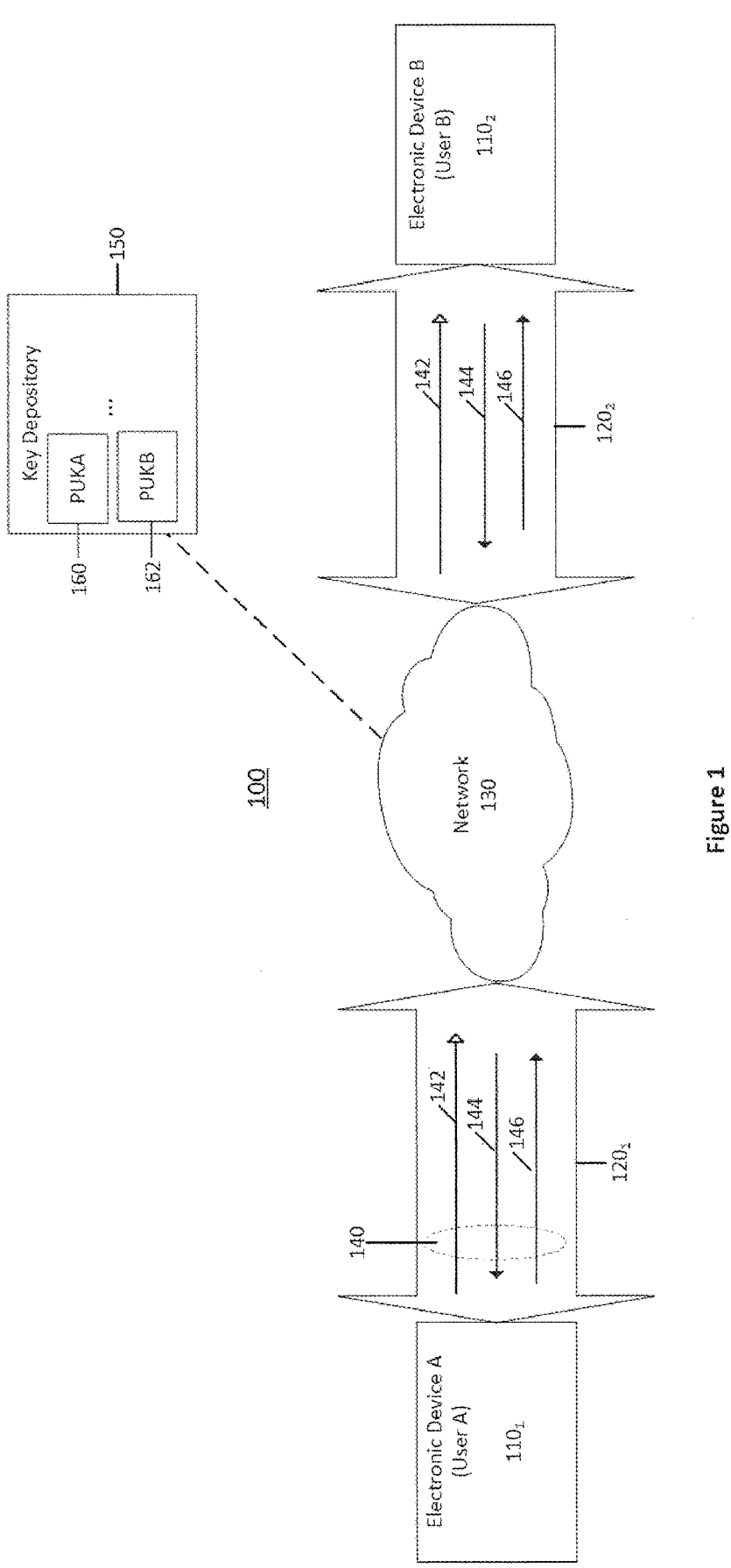
FIG. 1 is an exemplary embodiment of a communication system utilizing an improved asymmetric cryptographic communication protocol referred to as Secure Authentication and Identity Loop (SAIL).

Referring to FIG. 1, an exemplary embodiment of the general architecture of a communication system 100 utilizing an improved asymmetric cryptographic communication scheme configured to provide a more reliable user authentication and/or key exchange, referred to as "Secure Authentication and Identity Loop" (SAIL), is shown. Herein, the communication system 100 includes one or more electronic devices $110_1$-$110_N$ (N≥1), which are communicatively coupled to a network 130 via interconnects $120_1$-$120_N$. As shown, a first electronic device $110_1$ may be configured to exchange one or more cryptographically protected transmissions 140 with a second electronic device $110_1$. This message exchange scheme features three (3) successive peer-to-peer cryptographically protected transmissions 140, represented by transmissions 142, 144 and 146 propagating over the network 130, to collectively identify and authenticate the source (User A) and targeted destination (User B) prior to subsequent secure communications that may include sensitive data (e.g., personally identifiable information. sensitive data such as financial records, etc.). User A may include the first electronic device $110_1$ and/or an individual utilizing the first electronic device $110_1$. User B may include the second electronic device $110_2$ and/or an individual utilizing the second electronic device $110_2$.

Additionally, a key depository 150 is an electronic device that is communicatively coupled to the network 130 and permits any of the electronic devices $110_1$ . . . and/or $110_N$ to register with and publish its asymmetric public key. Unlike a certificate authority that manages the authenticity of the stored certificates, the key depository 150 maintains the public keys for registered electronic devices and/or its users. As shown, a first user (User A) $110_1$ is associated with a first public key (PUKA) 160 that is stored within the key depository 150. Similarly, a second public key (PUKB) 162 associated with the second user (User B) $110_2$ is stored within the key depository 150. Hence, the first electronic device 110₁ is able to retrieve PUKB 162, and the second electronic device 110₂ is able to retrieve PUKA 160, as shown in FIGS. 3B-4B.

Figure 2:
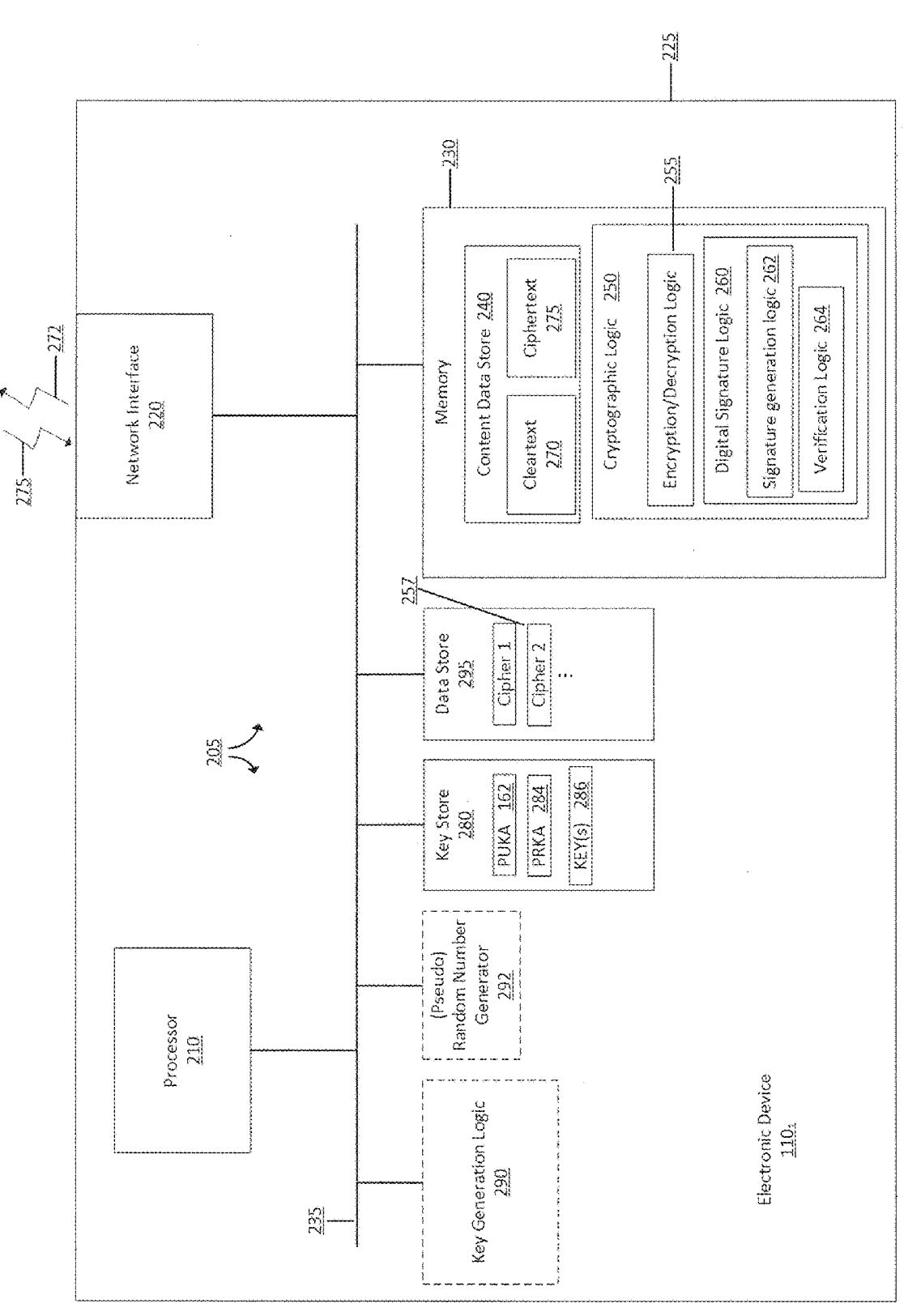
FIG. 2 is an exemplary block diagram of a general architecture of the first electronic device of FIG. 1 operating as part of the communication system.

Referring now to FIG. 2, an exemplary block diagram of a general architecture of an electronic device (e.g., the first electronic device 110₁) operating as part of the communication system 100 of FIG. 1 is shown. Herein, the electronic device 110₁ includes a plurality of components 205 including, but not limited or restricted to the following: a processor 210, a network interface 220, and/or a memory 230. The components 205 are communicatively coupled together via an interconnect 235. When the first electronic device 110₁ is deployed as a physical device, the components 205 may be at least partially encased in a housing 225 made entirely or partially of a rigid material (e.g., hardened plastic, metal, glass, composite, or any combination thereof) to protect these components 205 from environmental conditions. The network interface 220 operates to provide information originating outside of the housing 225 to the components 205 deployed within the housing 225.

The processor 210 may be implemented as a multipurpose, programmable component that accepts digital data as input, processes the input data according to stored instructions, and provides results as output. One example of the processor 210 may include a central processing unit (CPU) with a corresponding instruction set architecture. Alternatively, the processor 210 may include a digital signal processor (DSP), graphics processing unit (GPU), an Application Specific Integrated Circuit (ASIC), a field-programmable gate array (FPGA), a microcontroller, or any other electronic circuitry that is configured to support data processing.

As shown in FIG. 2, the processor 210 is communicatively coupled to the memory 230 via the interconnect 235. According to one embodiment of the disclosure, the memory 230 may correspond to persistent storage and/or non-persistent storage. As shown, the memory 230 may include (i) a content data store 240 and (ii) cryptographic logic 250, which includes encryption/decryption logic 255 and digital signature logic 260. The content data store 240 may be configured to store cleartext 270 (e.g., content stored in a non-encrypted format) and/or ciphertext 275 (e.g., content in an encrypted format) received via the network interface 220 for temporary storage in the content data store 240 as shown (or stored as cleartext or re-encrypted to prevent access to the cleartext version of the ciphertext 275).

As further shown in FIG. 2, the cryptographic logic 250 includes encryption/decryption logic 255, which is configured to (i) encrypt cleartext 270 retrieved from the content data store 240 to produce ciphertext 272 for transmission from the electronic device 110₁ via the network interface 220 and/or (ii) receive the ciphertext 275 (encrypted content) via the network interface 220 for temporary storage in the content data store 240 as shown and/or for subsequent decryption.

In performing cryptographic operations, the encryption/decryption logic 255 has access to protected, persistent memory operating as a key store 280, which includes one or more asymmetric keys (e.g., asymmetric keys directed to the electronic device 110₁ such as PUKA 160, PRKA 284, etc.), which may be produced by a key generation logic 290 based on a value produced by a number generator 292. The number generator 292 may correspond to a pseudo random number generator or a random number generator. The key store 280 may further include one or more asymmetric keys 286 utilized by one or more third parties such as third-party public keys directed to electronic devices (or users of these electronic devices) retrieved from the key depository 150 of FIG. 1.

The encryption/decryption logic 255 may be communicatively coupled to a data store 295 including one or more cryptographic cipher(s) 257 for use in encrypting content (generating ciphertext) in accordance with a particular cipher and recovering the content in non-encrypted format. The cryptographic cipher(s) 257 may include a single cryptographic cipher or a cipher suite including multiple ciphers that provides flexibility in the use of certain ciphers based on customer preference, type of application being used to generate the ciphertext 272 for transmission, or geographic regulations.

The digital signature logic 260 is configured with signature generation logic 262, which is configured to generate a digital signature to accompany the encrypted content (ciphertext) 272 as part of an authentication message being part of a cryptographically protected transmission. The digital signature logic 260 is further configured with verification logic 264 to perform verification operations on content within a digital signature received as part of an incoming cryptographically protected transmission to confirm origination of the transmission from a user (e.g., User B) and recover contents with the digital signature to verify the encrypted contents have not been tampered.

III. Secure Authentication and Identity Loop (SAIL) Operations

According to one embodiment of the disclosure, a multistage, cryptographic message exchange is conducted between a plurality of electronic devices to identify and authenticate users of the electronic device to further mitigate man-in-the-middle attacks through a more robust authentication scheme while maintaining the workflow of TLS. As described herein, a first user (User A) wants to securely communicate with a targeted second user (User B) independent of whether both User A and User B have previously met. Operating in accordance with SAIL, the first user (User A) securely identifies herself to a second user (User B), where User B authenticates User A. User B also securely identifies himself to User A and User A authenticates User B. These message exchanges provide a secure two-way authentication and identify a confirmation process to protect against a man-in-the-middle attacks. In doing so, both User A and User B would be able to securely and verifiably obtain public keys.

Referring now to FIG. 3A, an exemplary embodiment of a first cryptographically protected transmission 142 of a multi-stage, cryptographic message exchange (referred to as "SAIL") protocol is described. Initially, a first user (User A) receives an asymmetric public key associated with a second user (User B) to which User A desires to establish a secure communication session (block 300). Hence, the User A initiates a first cryptographically protected transmission by formulating a first authentication message directed to the second user (User B). In particular, the first user (User A) selects content to be included as part of the first cryptographically protected transmission, where the content is temporarily stored within the first electronic device and encrypted by logic within the first electronic device using the public key of second user (blocks 305 and 310). Additionally, the encrypted content (e.g., entire encrypted content, a representation of the encrypted content such as its hash value, or a portion of the encrypted content or hash value) is signed with a private key of the first user (PUKA)

to generate a first digital signature (block 315). The encrypted content and the first digital signature are included as part of a first authentication message output from the first electronic device, which is provided as part of the first cryptographically protected transmission to a second electronic device associated with the second user (blocks 320 and 325).

Referring now to FIG. 3B, an illustrative diagram of the first cryptographically protected transmission 142 outlined in FIG. 3A is shown. Herein, the key depository 150 is accessible to obtain asymmetric public keys for use in securing communications between two users. As shown, the first electronic device 110₁ associated with a first user (User A) initiates a key query message 350 to the key depository 150 to request a public key of a targeted user (User B) to which User A desires to establish a secure communication session. The public key for User B, namely "PUKB 162," is included as part of a key response message 355 returned to the first electronic device 110₁ from the key depository 150. Thereafter, the encryption/decryption logic within the first electronic device 110₁ is configured to encrypt content 360 intended to be provided to User B (referenced as "Content_1 360") using PUKB 162 to produce encrypted content 365. The encrypted content 365 is referenced in FIG. 3B as "E[Content_1]$_{PUKB}$" 365.

Along with the encrypted content (E[Content_1]$_{PUKB}$) 365, the first electronic device 110₁ transmits a first digital signature 370 including at least the encrypted content 365 (e.g., entire encrypted content 365, a representation of the encrypted content 365 such as its hash value, or a portion of the encrypted content 365 or hash value) encrypted with a private key (PRKA) 284 assigned to the first user (User A). The first digital signature 370, referenced in FIG. 3B as "RSA.Sign(E[Content_1]$_{PUKB}$, PRKA)," may be used to determine that the encrypted content has not been tampered and to recover the first content (content_1) selected by the first user (User A). The encrypted content 365 and the first digital signature 370 form a first authentication message 375 being part of the cryptographically protected transmission 142 provided to the second electronic device 110₂ associated with User B.

Figure 4A:
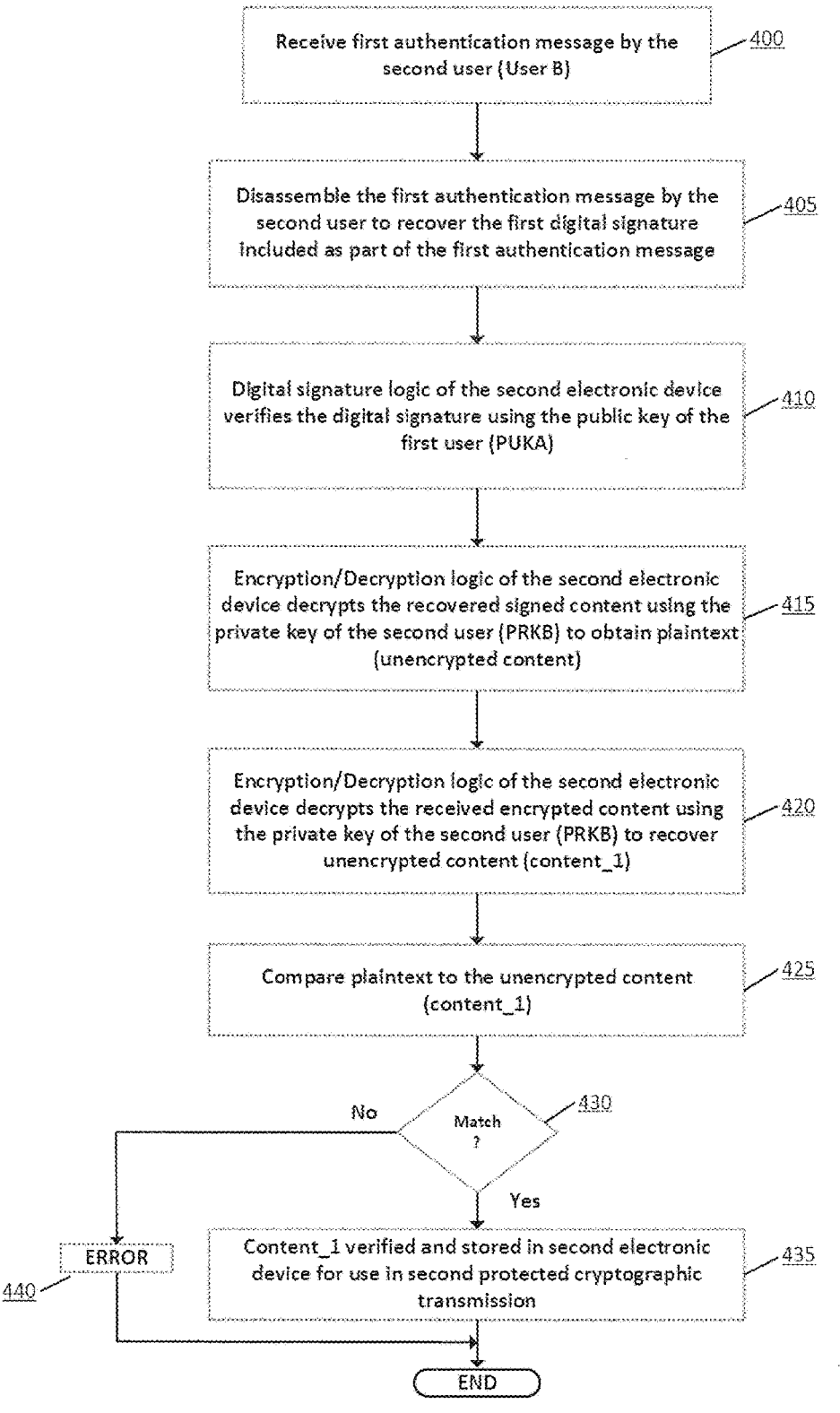
FIG. 4A is an exemplary embodiment of the recovery and authentication of content provided in the first cryptographically protected transmission in accordance with the SAIL protocol.

Referring to FIG. 4A, an exemplary embodiment of recovery and authentication of content (content_1) provided in the first cryptographically protected transmission 142 according to the SAIL protocol is described. Upon receipt of the first authentication message 375 of FIG. 3B, the second user (User B) disassembles the first authentication message to recover the first digital signature and the encrypted content (blocks 400 & 405). Using the public key of the first user (PUKA), the cryptographic logic within the second electronic device verifies the first digital signature by recovering the signed content from the first digital signature and comparing the recovered signed content to the encrypted content that accompanies the digital signature (block 410). This verification may involve the cryptographic logic of the second electronic device recovering the signed content from the digital signature using the public key of the first user (PUKA). For this embodiment of the disclosure, the recovered signed content should match the encrypted content.

Thereafter, using the private key (PRKB) of the second user (User B), the cryptographic logic of the second electronic device may decrypt the recovered signed content to obtain plaintext (unencrypted content) therefrom (block 415). Conducted with the operations for obtaining the plaintext, the cryptographic logic of the second electronic device may be configured to further decrypt the received encrypted content using the private key (PRKB) to recover the unencrypted content (content_1), which may be compared to the plaintext (blocks 420 and 425). If there is a match is detected (e.g., a correlation is greater than a prescribed threshold), the content_1 has been verified and is stored within the second electronic device for use in the second cryptographically protected transmission as described in FIGS. 5A-5B (blocks 430 and 435). Otherwise, an error condition is detected (block 440).

Figure 4B:
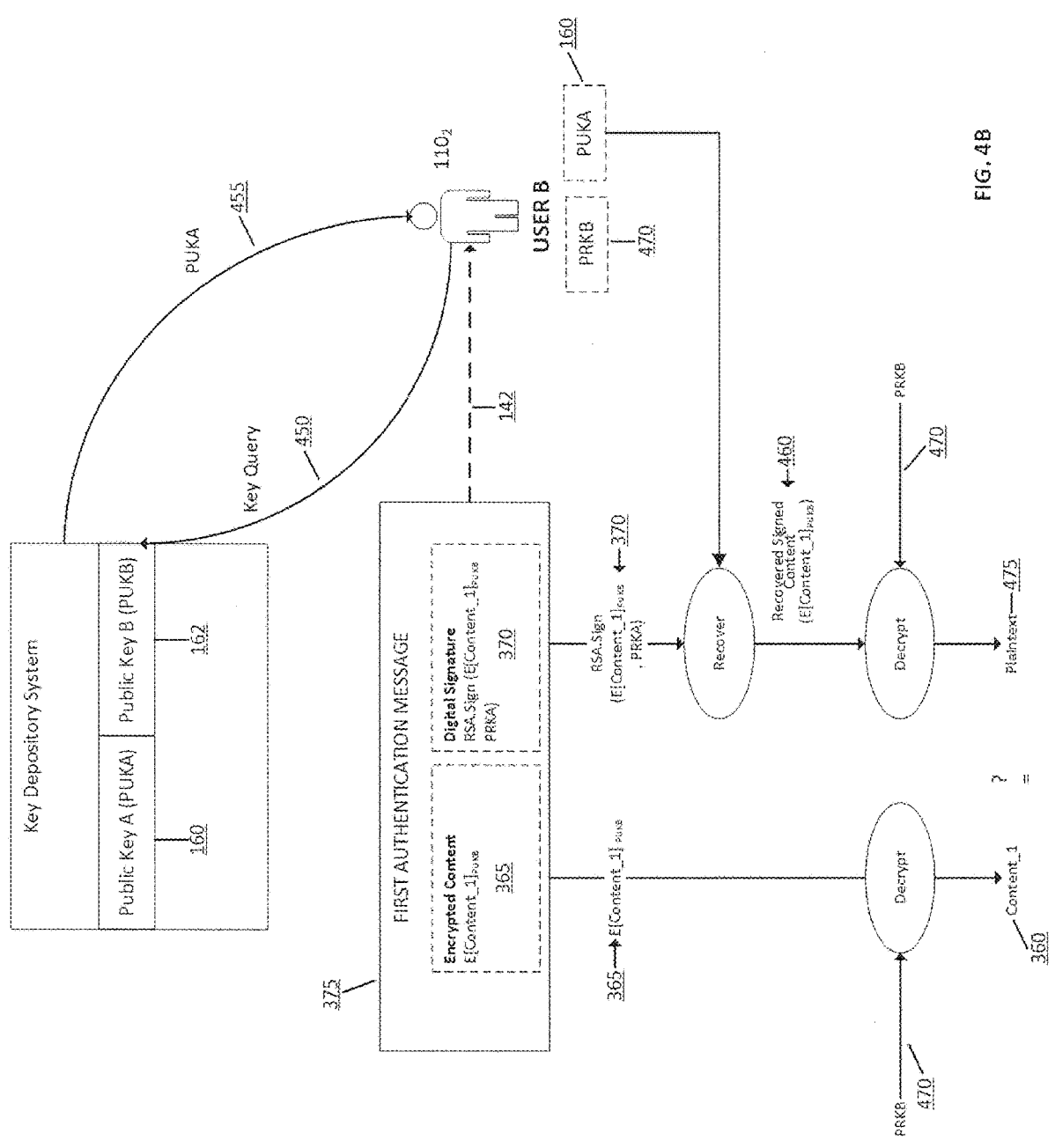
FIG. 4B is an illustrative diagram of the recovery and authentication of the content recovered from the first cryptographically protected transmission as shown in FIG. 4A.

Referring now to FIG. 4B, an illustrative diagram of the recovery and authentication of the content (content_1) recovered from the first cryptographically protected transmission 142 also illustrated in FIG. 3B is shown. Herein, the first authentication message 375 is received by the second electronic device 110₂ associated with User B. Additionally, in some cases subsequent to receipt of the first authentication message 375, the second electronic device 110₂ associated with the second user (User B) initiates a key query message 450 to the key depository 150 to request a public key 162 of User A. The public key for User A, namely "PUKA 160," is included as part of a key response message 455 returned to the second electronic device 110₂ from the key depository 150. Thereafter, digital signature logic within the second electronic device 110₂ is configured to verify the digital signature 370 by recovering the signed content (E[Content_1]$_{PUKB}$) 460 of the digital signature (RSA.Sign (E[Content_1]$_{PUKB}$, PRKA)) 370. The encryption/decryption logic within the second electronic device 110₂ is further configured, using the private key of User B (PRKB) 470 to recover plaintext content 475 from the signed content (E[Content_1]$_{PUKB}$) 460.

Additionally, the cryptographic logic within the second electronic device 110₂ may be configured to gain access to and decrypt the encrypted content (E[Content_1]$_{PUKB}$) 365 provided by the first authentication message 375. The encryption/decryption logic within the second electronic device 110₂ decrypts the encrypted content (E[Content_1]$_{PUKB}$) 365 using the private key of the User B (PRKB) 470 to obtain the unencrypted content (Content_1) 360. The unencrypted content (Content_1) 360 may be compared with the recovered plaintext 475, and if there is a match (or a correlation is greater than a prescribed threshold), the content_1 has been verified and is stored within the second electronic device 110₂ for use in the second cryptographically protected transmission as described in FIGS. 5A-5B.

Referring now to FIG. 5A, an exemplary embodiment of a second cryptographically protected transmission 144 in accordance with the SAIL protocol is described. Initially, as described above, the second user (receiver) obtains the asymmetric public key (PUKA) associated with the first user (User A), which is targeted to receive the second cryptographically protected transmission in response to the first cryptographically protected transmission of FIGS. 3A-3B (block 500). The second user (User B) selects and stores content for use in user authentication, which is referred to as "content_2" (block 505). The second user (User B), in particular logic within the second electronic device, combines the recovered unencrypted content (content_1) with the selected content (content_2). According to one embodiment of the disclosure, the combination may be a concatenation of content_1 and content_2 to produce a combined content (block 510).

Thereafter, the combined content is encrypted by cryptographic logic within the second electronic device using the public key (PUKA) of the first user (block 515). Additionally, the encrypted combined content (e.g., entire encrypted combined content, a representation of the encrypted combined content such as its hash value, or a portion of the encrypted combined content or its hash value) may be signed with a private key of the second user (PRKB) to generate a second digital signature (block 520). The encrypted combined content and the second digital signature are included within a second authentication message being part of the second cryptographically protected transmission 144 provided from the second electronic device to the first electronic device associated with the first user (blocks 525 and 530).

Referring now to FIG. 5B, an illustrative diagram of the second cryptographically protected transmission 144 described in FIG. 5A is shown. Herein, in preparation of the second cryptographically protected transmission 144 from the second electronic device 110₂ to the first electronic device 110₁, the second electronic device 110₂ generates the combined content 555, which is a combination of the first content (content_1) 360 with the second content (content_2) 550 selected by User B. For example, as shown, the combined content 555 may correspond to a concatenation of the second content (content_2) 550 with the first content (content_1) 360. As another example, however, the combined content 555 may correspond to a logical byte wise or bitwise aggregation of the first content (content_1) 360 and the second content (content_2) 550.

After generation, the cryptographic logic within the second electronic device 110₂ encrypts the combined content 555 using the public key of the first user (PUKA) 160 to produce a second encrypted content 560. Additionally, the second encrypted content 560 (e.g., entire encrypted combined content 560, a representation of the encrypted combined content 560 such as its hash value, or a portion of the encrypted combined content 560 or its hash value) is signed with the private key of the receiver (PRKB) 470 to generate a second digital signature 570. The second encrypted content 560 and the second digital signature 570 are included as part of a second authentication message 575, which is provided as part of the second cryptographically protected transmission 144 output from the second electronic device 110₂ to the first electronic device 110₁ associated with the first user (User A).

Referring to FIG. 6A, an exemplary embodiment of recovery and authentication of the combined content 555 provided in the second cryptographically protected transmission 144 in accordance with SAIL is described. Upon receipt of the second authentication message 575 of FIG. 5B, the first user (User A) disassembles the second authentication message to recover the second digital signature and the second encrypted content (blocks 600 and 605). Using a public key of the second user (PUKB), the digital signature logic within the first electronic device verifies the second digital signature by recovering the signed combined content from the digital signature and comparing the signed combined content with the second encrypted content (block 610). If a match is detected, the second encrypted content has not been tampered during transmission. Otherwise, an error condition is detected (blocks 615 and 620).

Upon detecting that the second encrypted content has not been tampered during transmission, the encryption/decryption logic of the first electronic device may be configured to decrypt and verify the accuracy of the combined content by (i) recovering the combined content from the signed combined content included in the digital signature (hereinafter, "signature-based combined content") and the combined content from the second encrypted content and (ii) verifying the signature-based combined content is correlated with the combined content recovered by decrypting the second encrypted content (blocks 625 and 630). Upon verification, the first user (User A) has confirmed that it is, in fact, communicating with the intended receiver, namely User B (blocks 635 and 640). Otherwise, another type of error condition is detected (block 645).

Referring now to FIG. 6B, an illustrative diagram of directed to authentication of the second user based on analysis of the second cryptographically protected transmission 144 in accordance with SAIL is shown. Herein, the second authentication message 575 is received from the second electronic device 110₂ associated with the second user (User B). Thereafter, the digital signature logic within the first electronic device 110₁ is configured to verify the second digital signature 570 by recovering the signed combined content (E[Combined Content]$_{PUKA}$) 650 of the digital signature (RSA.Sign(E [Combined Content]$_{PUKA}$, PRKB)) 570.

Upon receipt of the second authentication message 575, logic within the first electronic device 110₁ disassembles the second authentication message 575 to recover the second encrypted content 560 and the second digital signature 570. Using the public key of the second user (PUKB) 162, the digital signature logic within the first electronic device verifies the second digital signature 570 by recovering the signed combined content 650 from the second digital signature 570. As an optional operation, although not shown, the signed combined content 650 may be compared with the second encrypted content 560. If a match is detected, the second encrypted content 560 has not been tampered during transmission.

Besides the above-described operations by the digital signature logic, the encryption/decryption logic of the first electronic device 110₁ may be configured to decrypt and verify the accuracy of the combined content 555 by decrypting the recovered, signed combined content (E[Combined Content]$_{PUKA}$) 650, included as part of the second digital signature 570, to recover the signature-based combined content 660. Additionally, the encryption/decryption logic of the first electronic device 110₁ may be further configured to decrypt the second encrypted content (E[Combined Content]$_{PUKA}$) 560 to recover the combined content 670. Thereafter, a determination is made whether the correlation between the signature-based combined content 650 and the combined content 670 exceeds a prescribed threshold, and if so, no man-in-the-middle attack has been conducted.

Upon authentication, the cryptographic logic within the first electronic device 110₁ may be further configured to extract the first content 680 from the combined content 670, and thereafter, compare the extracted first content 680 to a stored first content 360. If a match is determined, the second user (User B) is authenticated as, given the first content 360 was encrypted with a public key of the second user (PUKB) 162, only the second user having a corresponding private key (PRKB) 470 could gain access to the first content (content_1) 360. Otherwise, where User B cannot be authenticated, the second encrypted content 560 cannot be decrypted, or a first portion of the combined content (e.g. first content 680) fails to match the first content 360 stored in the first electronic device 110₁ prior to the first cryptographically protected transmission 142, an adversary may have intercepted the second authentication message 575 denoting a man-in-the-middle attack.

Figure 7A:
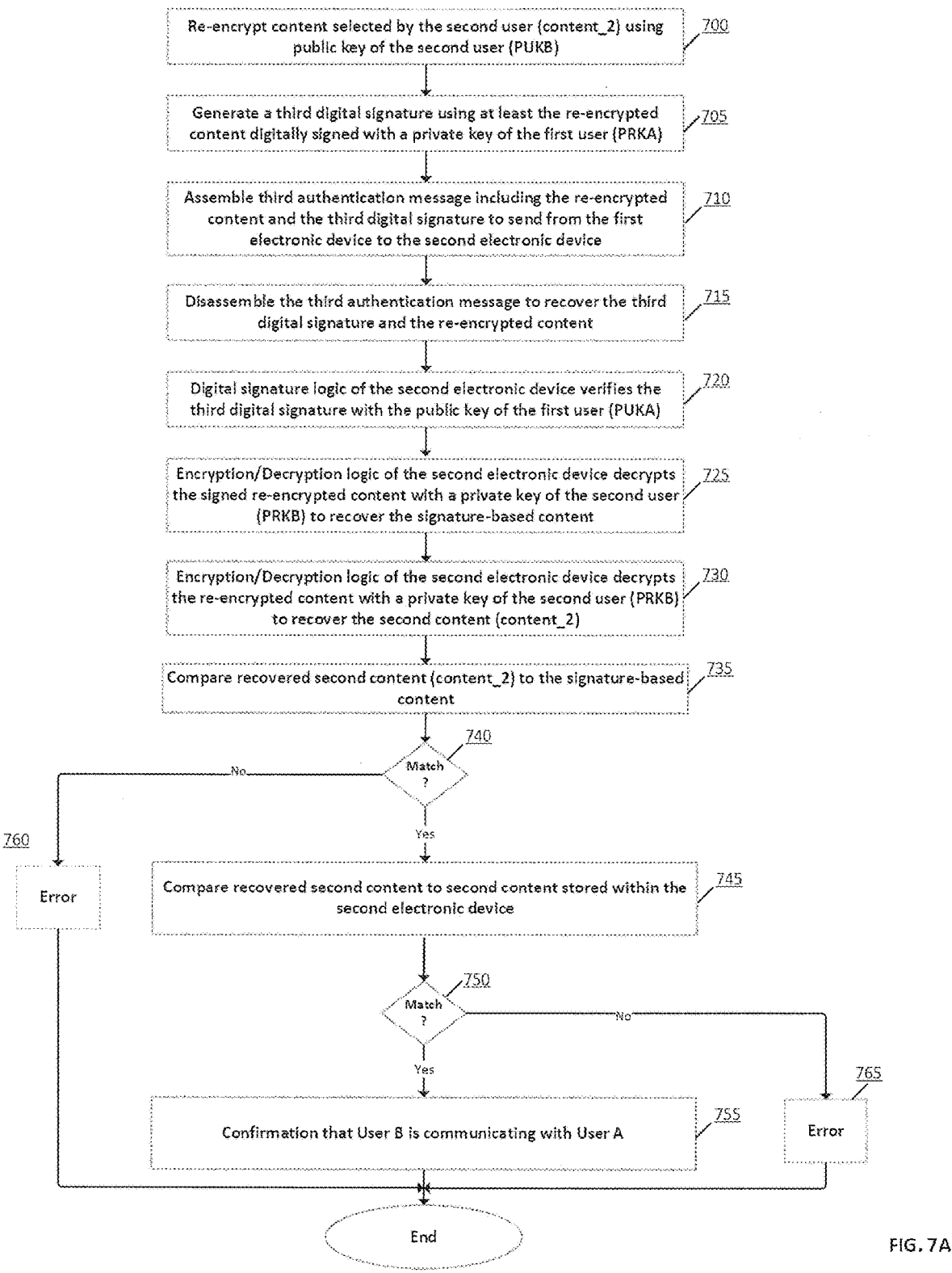
FIG. 7A is an exemplary embodiment of a flowchart of the operations for formulating and processing a third cryptographically protected transmission in accordance with the SAIL protocol.

Referring now to FIG. 7A, an exemplary embodiment of a flowchart of the operations for formulating and processing a third cryptographically protected transmission 146 in accordance with SAIL is described. Initially, content selected and provided as part of the combined content 670 by the second User B (e.g., second content 690, content_2 as shown in FIG. 6B) is re-encrypted using the public key (PUKB) of the second user (User B) to produce re-encrypted content (block 700). Along with the re-encrypted content, a third digital signature is generated using the re-encrypted content (e.g., entire re-encrypted content, a representation of the re-encrypted content such as its hash value, or a portion of the re-encrypted content or its hash value) digitally signed with the private key (PRKA) assigned to User A (block 705). The re-encrypted content and the third digital signature are assembled to form a third authentication message, which is output from the first electronic device to the second electronic device (block 710).

After receipt of the third authentication message as part of the third cryptographically protected transmission, logic within the second electronic device disassembles the third authentication message to retrieve the third digital signature and the re-encrypted content (block 715). Thereafter, the digital signature logic of the second electronic device is configured to verify the third digital signature (block 720). Such verification may be accomplished by recovering the signed re-encrypted content from the third digital signature for comparison to at least a portion of the re-encrypted content.

In response to verification of the third digital signature, the encryption/decryption logic of the second electronic device decrypts the signed re-encrypted content using the private key of User B (PRKB) to recover content therefrom, referred to as "signature-based content" (block 725). Operating with the recovery of the signature-based content, the encryption/decryption logic of the second electronic device further recovers the second content (content_2) from the re-encrypted content provided as part of the third authentication message (block 730). More specifically, the re-encrypted content may be decrypted using the private key of the User B (PRKB) to obtain the second content (content_2).

Thereafter, the second content (content_2) may be compared with the signature-based content, and if there is a match (e.g., a correlation equal to or greater than a prescribed threshold), the content_2 is compared with the stored content_2 for the User B to authenticate that it is in communications with User A (blocks 740-755). If no match for either of these comparisons (blocks 760 and 765), an error condition is detected to denote a potential man-in-the-middle attack or another potential illicit modification of data during transit.

Figure 7B:
FIG. 7B is an exemplary embodiment of the third cryptographically protected transmission in accordance with the SAIL protocol.

Referring now to FIG. 7B, an exemplary embodiment of the third cryptographically protected transmission 146 in accordance with SAIL is described. Herein, upon receipt and analysis of the combined content, cryptographic logic within the first electronic device 110_1 extracts the second content (content_2) 690 from the combined content 670 recovered from the second authentication message 575 of FIG. 6B. Thereafter, the cryptographic logic is configured to re-encrypt the second content (content_2) 690 using the public key (PUKB) 162 of the retriever (User B) to produce re-encrypted content 770. The re-encrypted content 770 is illustrated in FIG. 7B as "E[Content_2] PUKB."

Along with the re-encrypted content (E[Content_2]$_{PUKB}$) 770, the digital signature logic deployed within the first electronic device 110_1 is configured to generate a third digital signature 775 including at least the re-encrypted content 710 (e.g., entire re-encrypted content 770, a representation of the re-encrypted content 770 such as its hash value, or a portion of the re-encrypted content 770 or hash value) encrypted with the private key (PRKA) 284 assigned to the first user (User A). The third digital signature 775 is referenced in FIG. 7B as "RSA.Sign(E[Content_2]$_{PUKB}$;

PRKA)," may be used to determine whether the re-encrypted content (E[Content_2]$_{PUKB}$) 770 has been tampered during transmission and to extract the recovered second content 690 for analysis. The re-encrypted content 770 and the third digital signature 775 form a third authentication message 780 provided to the second electronic device 110_2 associated with User B.

After receipt of the third authentication message 780, the digital signature logic within the second electronic device 110_2 is configured to verify the third digital signature 775 by recovering signed second content (E[Content_2]$_{PUKB}$) 785 from the third digital signature 775. Optionally, the signed second content 785 may be compared to at least a portion of the re-encrypted content 770 to confirm non-tampering of the re-encrypted content 770 during transit.

In the event that the re-encrypted content 770 has not been tampered during transit, the encryption/decryption logic of the second electronic device 110_1 may decrypt the signed second content (E[Content_2]$_{PUKB}$) 785 using the private key of User B (PRKB) 470 to recover the second content as plaintext from the signed second content included in the third digital signature 775 (hereinafter, "signature-based second content 790"). Additionally, the encryption/decryption logic of the second electronic device 110_2 may be configured to gain access to and decrypt the re-encrypted content 770 provided by the third authentication message 780 to obtain the second content 690. More specifically, the encryption/decryption logic of the second electronic device 110_1 decrypts the re-encrypted content (E[Content_2]$_{PUKB}$ 770 using the private key of the User B (PRKB) 470 to obtain the recovered second content (Content_2) 690, which is content that can be traced back to combined content 555 generated by the second electronic device 110_2 prior to transmission of the second authentication message 575. The second content (content_2) 690 may be compared to the signature-based second content 790, and if there is a match (e.g., a correlation equal to or greater than a prescribed threshold), although not shown, the recovered second content (content_2) 690 may be compared with a stored version of the original second content (content_2) 550. If another match is detected, the second user (User B) has strongly authenticated that it is in communications with the first user (User A).

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computer-implemented method comprising, as performed by a first computing device associated with an intended recipient of transmissions:

receiving a first transmission from a second computing device associated with a sender of transmissions, the first transmission comprising first encrypted data corresponding to first data;

generating a second transmission comprising (1) a first digital signature signed by a private key assigned to the intended recipient and (2) second encrypted data encrypted using a public key assigned to the sender of transmissions, wherein the second encrypted data comprises an encrypted version of the first data and second data, and wherein the first digital signature comprises a representation of the first data and the second data;

sending the second transmission to the second computing device;

receiving a third transmission from the second computing device, the third transmission comprising (3) a second digital signature signed by a private key assigned to the sender and (4) third encrypted data encrypted with a public key assigned to the intended recipient; and verifying that the third transmission originated from the sender based at least partly on the second digital signature, and on determining that the third encrypted data comprises at least a portion of the second data, wherein the second digital signature is used to verify non-tampering of the second data during transit from the second computing device to the first computing device.

2. The computer-implemented method of claim 1, further comprising verifying a third digital signature signed by the private key assigned to the sender, wherein the third digital signature comprises a representation of first data encrypted by the second computing device to produce the first encrypted data.

3. The computer-implemented method of claim 2, further comprising generating a hash of the first data, wherein the representation of the first data comprises the hash of the first data.

4. The computer-implemented method of claim 1, further comprising:

generating a first hash of the second data;

recovering a representation of at least a portion of the second data from the second digital signature using the public key assigned to the sender, wherein the representation of the portion of the second data comprises a second hash of the second data; and comparing the first hash to the second hash, wherein verifying that the second transmission originated from the sender is based on results of comparing the first hash to the second hash.

5. The computer-implemented method of claim 1, further comprising generating an encrypted version of the first data concatenated to the second data using the public key assigned to the sender.

6. The computer-implemented method of claim 1, further comprising generating an encrypted version of a logical bitwise aggregation of the first data the second data.

7. The computer-implemented method of claim 1, further comprising decrypting the third encrypted data to recover a symmetric key combined with the portion of the second data.

8. The computer-implemented method of claim 7, wherein the second digital signature includes an encrypted combined result signed using the private key assigned to the sender.

9. The computer-implemented method of claim 1, further comprising decrypting a symmetric key using the private key assigned to the intended recipient to generate a decrypted symmetric key, wherein the third transmission includes an encrypted version of the symmetric key.

10. The computer-implemented method of claim 9, wherein the second digital signature comprises the encrypted version of the symmetric key digitally signed using the private key assigned to the sender.

11. A system comprising:

computer-readable memory storing a private key assigned to an intended recipient of transmission; and one or more processors in communication with the computer-readable memory and programmed by executable instructions to at least:

receive a first transmission from a computing device associated with a sender of transmissions, the first transmission comprising first encrypted data corresponding to first data;

generate a second transmission comprising (1) a first digital signature signed by the private key and (2) second encrypted data encrypted using a public key assigned to the sender of transmissions, wherein the second encrypted data comprises an encrypted version of the first data and second data, and wherein the first digital signature comprises a representation of the first data and the second data;

send the second transmission to the computing device;

receive a third transmission from the computing device, the third transmission comprising (3) a second digital signature signed by a private key assigned to the sender and (4) third encrypted data encrypted with a public key assigned to the intended recipient; and verify that the third transmission originated from the sender based at least partly on the second digital signature, and on determining that the third encrypted data comprises at least a portion of the second data, wherein the second digital signature is used to verify non-tampering of the second data during transit from the second computing device to the first computing device.

12. The system of claim 11, wherein the one or more processors are programmed by further executable instructions to verify a third digital signature signed by the private key assigned to the sender, wherein the third digital signature comprises a representation of first data encrypted by the computing device to produce the first encrypted data.

13. The system of claim 12, wherein the one or more processors are programmed by further executable instructions to generate a hash of the first data, wherein the representation of the first data comprises the hash of the first data.

14. The system of claim 11, wherein the one or more processors are programmed by further executable instructions to:

generate a first hash of the second data;

recover a representation of at least a portion of the second data from the second digital signature using the public key assigned to the sender, wherein the representation of the portion of the second data comprises a second hash of the second data; and compare the first hash to the second hash, wherein verifying that the second transmission originated from the sender is based on results of comparing the first hash to the second hash.

15. The system of claim 11, wherein the one or more processors are programmed by further executable instructions to generate an encrypted version of the first data concatenated to the second data using the public key assigned to the sender.

16. The system of claim 11, wherein the one or more processors are programmed by further executable instructions to generating an encrypted version of a logical bitwise aggregation of the first data the second data.

17. The system of claim 11, wherein the one or more processors are programmed by further executable instructions to decrypt the third encrypted data to recover a symmetric key combined with the portion of the second data.

18. The system of claim 17 wherein the second digital signature includes an encrypted combined result signed using the private key assigned to the sender.

19. The system of claim 11, wherein the one or more processors are programmed by further executable instructions to decrypt a symmetric key using the private key assigned to the intended recipient to generate a decrypted symmetric key, wherein the third transmission includes an encrypted version of the symmetric key.

20. The system of claim 19, wherein the second digital signature comprises the encrypted version of the symmetric key digitally signed using the private key assigned to the sender.

* * * * *